(12) United States Patent
Lane et al.

(10) Patent No.: US 12,706,482 B2
(45) Date of Patent: Aug. 11, 2026

(54) WIRELESS CHARGER AND A METHOD FOR PROVIDING THE SAME

(71) Applicant: Belkin International, Inc., El Segundo, CA (US)

(72) Inventors: Steven Lee Lane, Orange, CA (US); Vincent Razo, Granada Hills, CA (US); John F. Wadsworth, Burbank, CA (US); David A. Kleeman, Marina Del Rey, CA (US); Paer Saangloef, Los Angeles, CA (US); Mitchell Suckle, Long Beach, CA (US); Peter Schmidt, Chicago, IL (US)

(73) Assignee: BELKIN INTERNATIONAL, INC., El Segundo, CA (US)

( * ) Notice: Subject to any disclaimer, the term of this patent is extended or adjusted under 35 U.S.C. 154(b) by 921 days.

(21) Appl. No.: 17/984,087

(22) Filed: Nov. 9, 2022

(65) Prior Publication Data

US 2023/0147889 A1 May 11, 2023

Related U.S. Application Data

(60) Provisional application No. 63/277,527, filed on Nov. 9, 2021.

(51) Int. Cl.
*H02J 50/00* (2016.01)
*H02J 50/10* (2016.01)

(52) U.S. Cl.
CPC ............ *H02J 50/005* (2020.01); *H02J 50/10* (2016.02)

(58) Field of Classification Search
CPC ..................................................... H02J 50/005
(Continued)

(56) References Cited

U.S. PATENT DOCUMENTS 8,482,160 B2 * 7/2013 Johnson ................. A47B 97/00 307/104
2017/0070076 A1 * 3/2017 Karanikos ............. H02J 7/0042
(Continued)

FOREIGN PATENT DOCUMENTS

CN 205017053 2/2016
CN 210430966 4/2020
(Continued)

OTHER PUBLICATIONS

International Search Report and Written Opinion from PCT Application No. PCT/US22/049437 Mar. 10, 2023.
(Continued)

*Primary Examiner* — Ahmed H Omar
(74) *Attorney, Agent, or Firm* — BRYAN CAVE LEIGHTON PAISNER LLP

(57) ABSTRACT

A wireless charging module comprising a charging pad and a stand assembly hingedly coupled to the charging pad. In many embodiments, the stand assembly can include a top surface. The charging pad can be configured to be folded up or down relative to the top surface to wirelessly charge an electronic device in an upright position or a flat position, respectively, while the electronic device is located over the top surface. Further, the stand assembly can include an adjustable thickness. The stand assembly can be configured to cause a height of the charging pad to change, relative to a support surface for the charging module. Other embodiments are also provided.

20 Claims, 9 Drawing Sheets

(58) Field of Classification Search
USPC .......................................................... 320/108
See application file for complete search history.

(56) References Cited

U.S. PATENT DOCUMENTS

| | | | | |
|---|---|---|---|---|
| 2017/0070077 | A1 | 3/2017 | Karanikos et al. | |
| 2017/0115640 | A1* | 4/2017 | Wierenga ................ | H02J 50/10 |
| 2020/0052506 | A1 | 2/2020 | Green | |
| 2021/0336492 | A1* | 10/2021 | Chu ...................... | H02J 7/0047 |
| 2022/0094202 | A1* | 3/2022 | Karanikos ............. | H02J 7/0044 |

FOREIGN PATENT DOCUMENTS

| | | | | | |
|---|---|---|---|---|---|
| CN | 210780157 | | | 6/2020 | |
| CN | 211720281 | | | 10/2020 | |
| CN | 112510843 | | | 3/2021 | |
| CN | 214045066 | | | 8/2021 | |
| CN | 215870844 | | | 2/2022 | |
| CN | 216625339 | | | 5/2022 | |
| JP | 3236689 | | | 3/2022 | |
| KR | 1020140133164 | A | | 11/2014 | |
| KR | 1020190075700 | A | | 7/2019 | |
| KR | 20200038577 | A | * | 4/2020 | ............. H02J 50/10 |
| KR | 1020200038577 | A | | 4/2020 | |
| WO | 2022151359 | | | 7/2022 | |

OTHER PUBLICATIONS

"Charger Stand for Apple-Watch-Charger Stand with Charger Cable—Compatible with iWatch Series SE 7 6 5 4 3 2 (White)," https://www.amazon.com/dp/B09X1MDZ8G/, Accessed Oct. 15, 2022.

"Lifeegrn Charger Stand for Apple Watch, Portable Magnetic Wireless iWatch Charging Dock, Durable TPU with Non-Slip Stable Base,Compatible with iWatch Series SE/SE2/8/7/6/5/4/3/2/1, White," https://www.amazon.com/lifeegrn-Portable-Magnetic-Wireless-Compatible/dp/B09XDP4LSY/, Accessed Oct. 15, 2022.

"For Apple Watch Charger—2 in 1 Wireless Watch Charger Portable Charging Stand with Charging Cable Compatible with iWatch Series 7/6/5/4/3/2/SE—Charging Dock Station for AirPods 1/2/3/Pro," https://www.amazon.com/dp/B0B5VP75NL/, Accessed Oct. 15, 2022.

"Laudtec Magnetic Duo Wireless Charging Pad, Portable 2 in 1 Foldable Charging Dock Power Station for Apple Watch, Multiple Devices, Wireless Charger for iPhone 14/13/12/SE/11, AirPods," https://www.amazon.com/Magnetic-Wireless-Charging-Portable-Foldable/dp/B08R77CC2F, Accessed Oct. 15, 2022.

"DREU Magnetic Foldable Charging Pad Portable Wireless Chargers 3 in 1, Fast Wireless Charging Station Compatible with QI Phones, iPhone 14/13/12/SE/11/XS/8, Samsung, AirPods Pro, Apple Watches," https://www.amazon.com/Magnetic-Foldable-Charging-Portable-Compatible/dp/B09TQLXBY9/, Accessed Oct. 15, 2022.

"Magnetic Wireless Charger Foldable, 18W Fast Mag-Safe Charger Compatible with iPhone 14/13/12/11/Pro/SE/XS/XR/X/8 Plus,3 in 1 Charging Station Compatible with iWatch 7/6/SE/5/4/3/2,Airpods 2/3/Pro," https://www.amazon.com/Magnetic-Wireless-Foldable-Mag-Safe-Compatible/dp/B09X2GT178/, Accessed Oct. 15, 2022.

"Conido Charging Stand for Apple Watch, Watch Charging Stand with Charging Cable, Magnetic Wireless Charging Station Compatible with Apple Watch SE Series 7/6/5/4/3/2/1/44mm/42mm/40mm/38mm—Black," https://www.amazon.com/Conido-Charging-Magnetic-Wireless-Compatible/dp/B085ZHH7LW/ref=psdc_10048700011_I2_B09X1MDZ8G?th=1, Accessed Oct. 27, 2022.

* cited by examiner

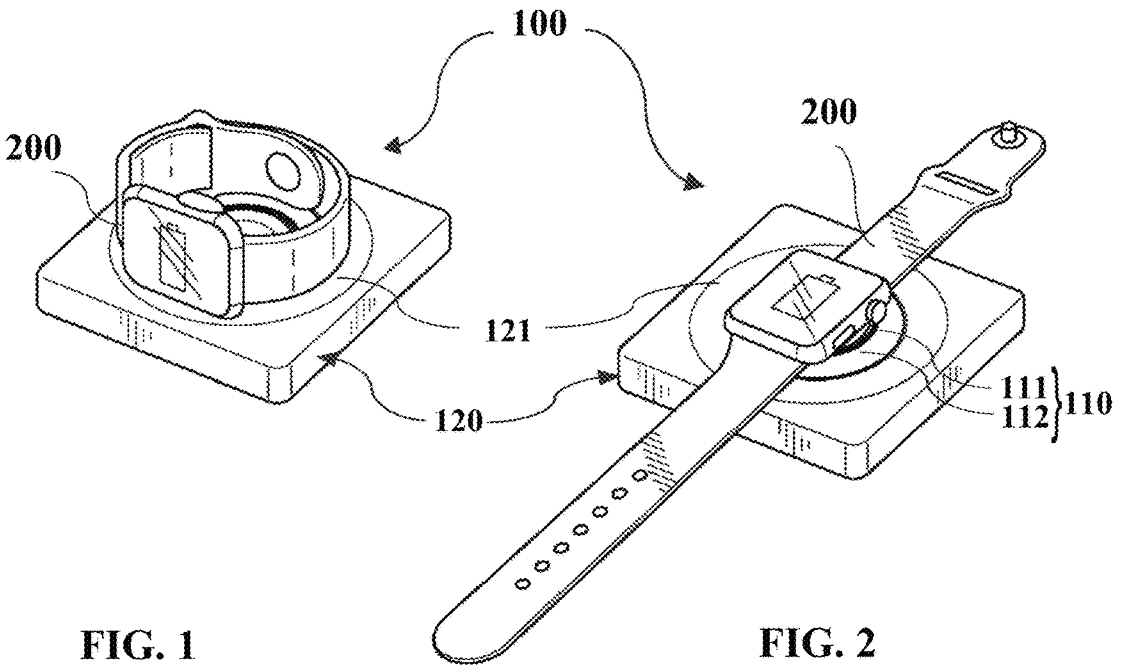
FIG. 1
FIG. 2
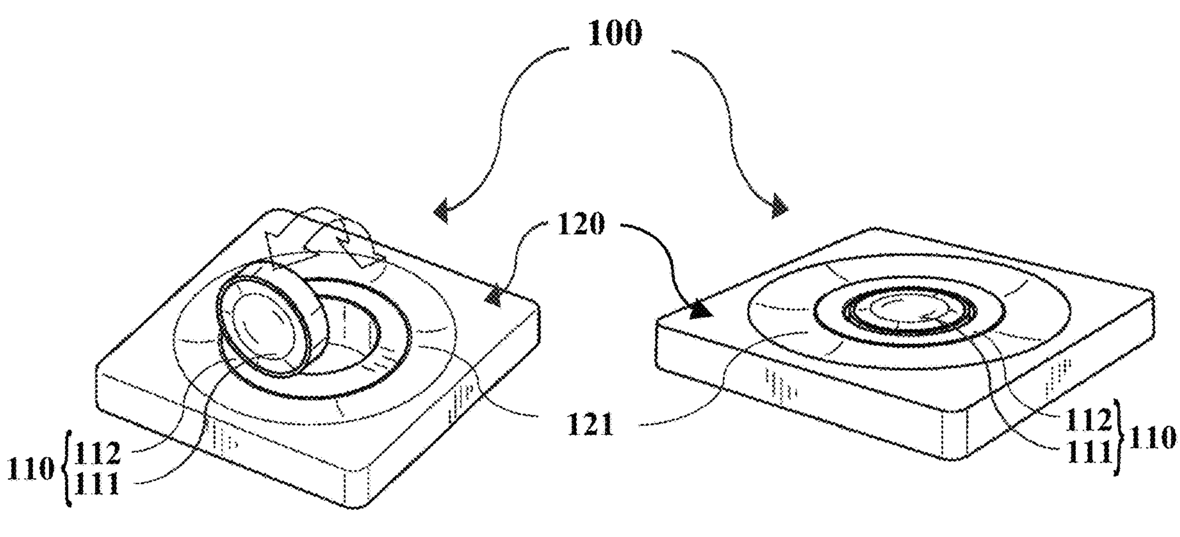
FIG. 3
FIG. 4

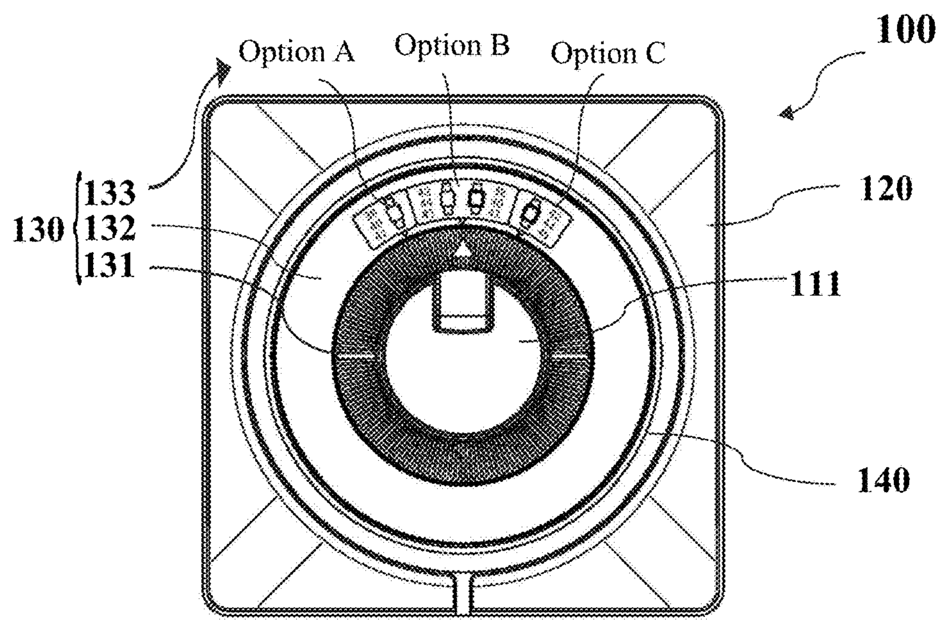
FIG. 5
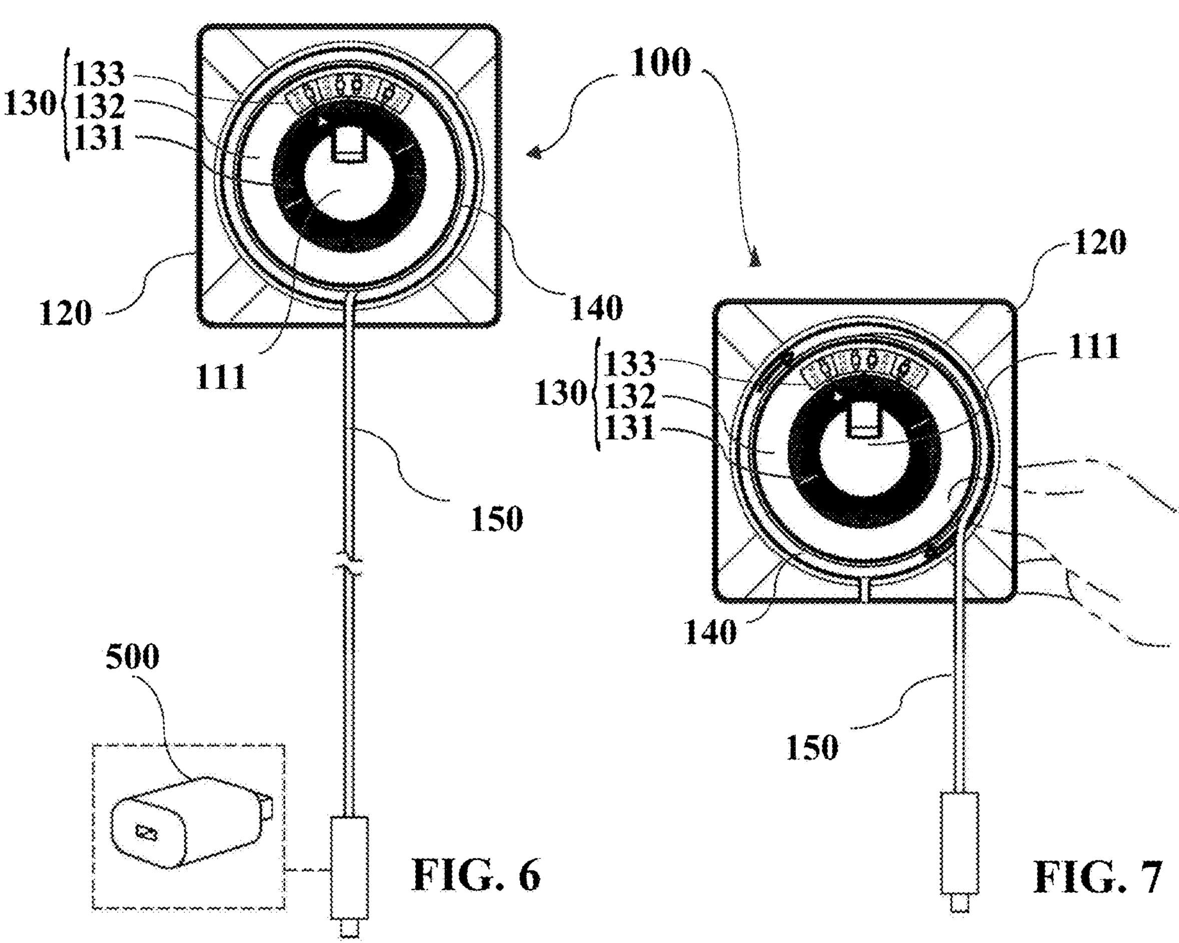
FIG. 6
FIG. 7

1012
10311
10122
10123
10121
1031
1000

1012
10311
10122
10123
10121
1031
1000

1012
10123
10122
10311
10121
1031
1000

1600
1620
1610
1640
1611
1612

1600
1620
1700
1640

1600
1660

1600
1800
1670

WIRELESS CHARGER AND A METHOD FOR PROVIDING THE SAME

CROSS-REFERENCE TO RELATED APPLICATIONS

This application claims priority to U.S. Provisional Patent Application No. 63/277,527, filed Nov. 9, 2021. U.S. Provisional Patent Application No. 63/277,527 is incorporated herein by reference in its entirety.

TECHNICAL FIELD

This disclosure relates generally to wireless chargers for electronic devices.

BACKGROUND

Wireless chargers are popular for various reasons such as convenience, safety, etc. Many wireless chargers for smart watches allow a smart watch to be charged in a flat position or in an upright position (the nightstand mode) so that a user can see the face of the smart watch when lying in bed. However, wireless chargers that support a form of the nightstand mode are generally bulky and not easy to carry around, especially for travel. Further, alignment between a wireless charging module and a smart watch is generally important for the performance of the charging module, but a smart watch with even a thin case may still affect the alignment. Therefore, a compact wireless charger with a compact charging module that can be adjusted for improved alignment is desired.

BRIEF DESCRIPTION OF THE DRAWINGS

To facilitate further description of the embodiments, the following drawings are provided in which:

FIG. 1 illustrates a top, front, right side perspective view of a wireless charger charging an electrical device in an upright position, according to an embodiment;

FIG. 2 illustrates a top, front, right side perspective view of a wireless charger charging an electrical device in a flat position, according to an embodiment;

FIG. 3 illustrates a top, front, right side perspective view of a wireless charger with a charging module, wherein a charging pad of the charging module is folded up, according to an embodiment;

FIG. 4 illustrates a top, front, right side perspective view of a wireless charger with a charging module, wherein a charging pad of the charging module is folded down, according to an embodiment;

FIG. 5 illustrates a bottom plan view of a wireless charger; according to an embodiment;

FIG. 6 illustrates a bottom plan view of a wireless charger with a power cable extended to be connected to a power adapter, according to an embodiment;

FIG. 7 illustrates a bottom plan view of a wireless charger with a power cable partially wrapped in a cable management structure, according to an embodiment;

Figure 8:
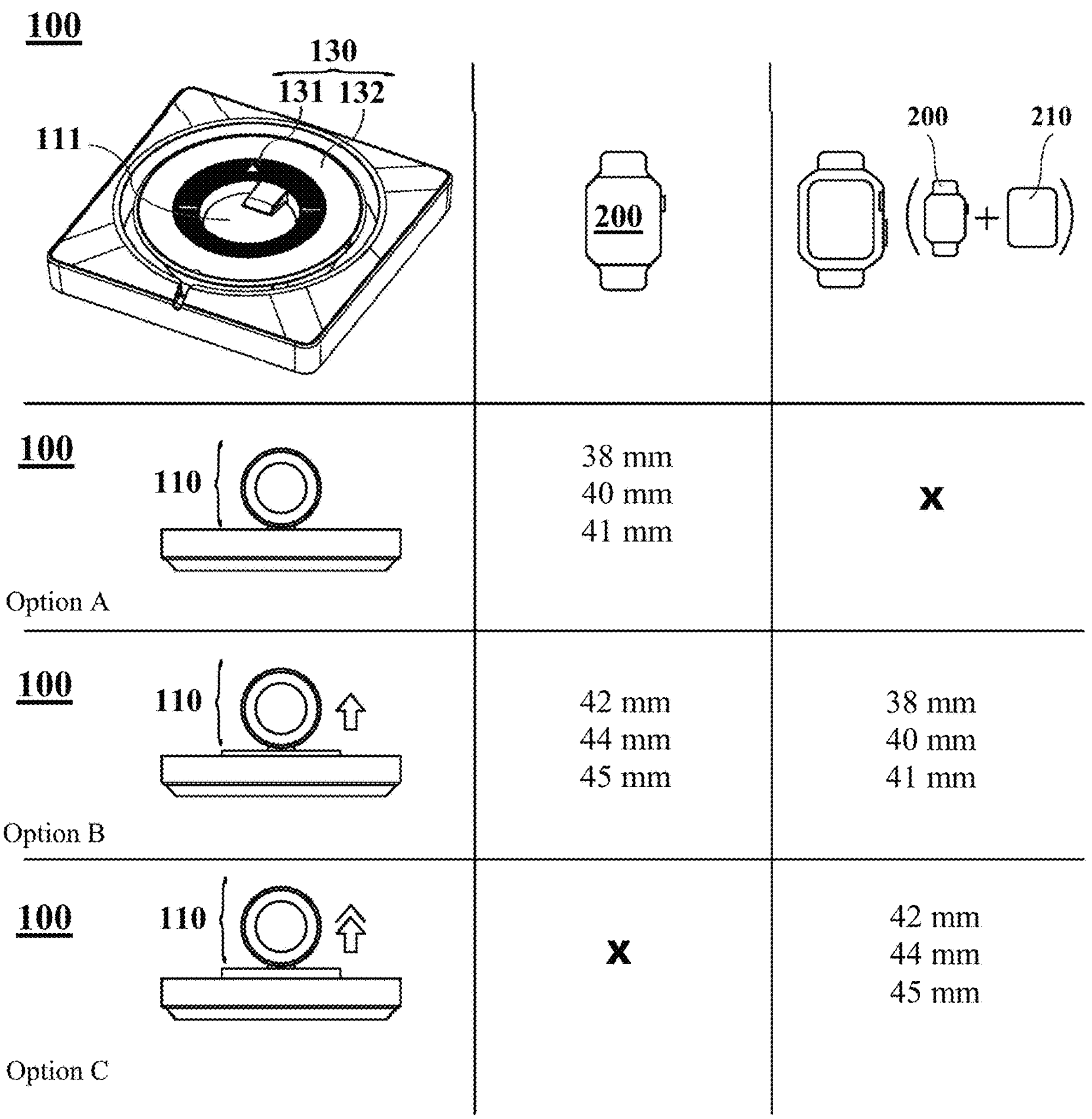
FIG. 8 illustrates a table of exemplary settings for a wireless charger and the corresponding heights of the electronic devices or the electronic devices with cases, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a wireless charging module. The wireless charging module can be used to charge an electronic device. Examples of the electronic device can include a smart watch (e.g., an Apple Watches® Series 3, 4, 5, 6, 7, and/or SE by Apple Inc. of Cupertino, California, United States of America ("Apple Inc.")), or a device with similar models, for which the respective height of the center of the battery varies slightly based on the models, etc. In many embodiments, the wireless charging module can include a charging pad and a stand assembly hingedly coupled to the charging pad. The stand assembly can include a top surface. The charging pad can be configured to be folded up or down relative to the top surface to wirelessly charge an electronic device in an upright position or a flat position, respectively, while the electronic device is located over the top surface. For instance, when the charging pad is folded up relative to the top surface, the charging pad can wirelessly charge the electronic device in an upright position, when the electronic device is placed on a support surface (e.g., the top surface of a base, a table, or the floor for supporting the charging module) on the side surface of the electronic device, with the back surface of the electronic device adjacent to the top surface. When the charging pad is folded down relative to the top surface of the stand assembly, the charging pad can wirelessly charge the electronic device in a flat position, when the electronic device is placed on top of the charging pad and the top surface. In many embodiments, the stand assembly further can include an adjustable thickness and can be configured to cause a height of the charging pad to change, relative to the top surface for the wireless charging module.

In a number of embodiments, the stand assembly further can include a control configured to allow a user to select one of multiple levels (e.g., 2, 3, or 4 levels) for the adjustable thickness of the stand assembly. The thickness increment between two consecutive levels of the multiple levels for the adjustable thickness can be in a range of 1-2 millimeters (mm) or any suitable increments, depending on the dimensions of the electronic devices to be charged. The adjustable thickness of the stand assembly can be implemented by any suitable mechanisms. In some embodiments, the control of the stand assembly can include at least one tab and at least one rail corresponding to the at least one tab. The adjustable thickness can be set at one of the multiple levels for the adjustable thickness when a tip of the at least one tab is received in one of multiple slots (e.g., 2, 3, or 4 slots) of the at least one rail. Each of the multiple slots can correspond to a respective level of the multiple levels. The at least one tab can be configured to be moved horizontally relative to the at least one rail to increase or decrease the adjustable thickness of the stand assembly. The horizontal movement of the at least one tab can be any suitable movement, including linear, zigzagged, curved, or circular, etc.

In a number of embodiments the control further can include a dial face plate for rotatably switching among the multiple levels (e.g., 2, 3, 4, or 5 levels). In embodiments where the control includes the dial face plate, the control also can include any suitable components to adjust the adjustable thickness of the stand assembly. In several embodiments, the control further can include at least one tab and at least one rail corresponding to the at least one tab. The adjustable thickness can be set at one of the multiple levels when a tip of the at least one tab is received in a corresponding slot of multiple slots of the at least one rail. Each of the multiple slots can correspond to a respective level of the multiple levels. For example, when there are 3 levels for the adjustable thickness, there can be 3 slots on the at least one rail, each slot corresponding to a different one of the 3 levels.

In some embodiments, the dial face plate can be configured to be rotated to cause the at least one tab to move horizontally relative to the at least one rail to increase or decrease the adjustable thickness of the stand assembly. For instance, in an embodiment, a user can select one among 3 levels by rotating the dial face plate, which in turn causes the at least one tab to rotate along with the dial face plate on a horizontal surface, while the at least one rail with 3 slots at different heights remains relatively stationary. After the dial face plate is rotated to the level the user desires, the tip of the at least one tab can be received in the slot corresponding to the level, and the adjustable thickness thus can be set. Once the adjustable thickness is set, the height of the charging pad, relative to the support surface for the wireless charging module, is changed.

The wireless charging module in various embodiments further can include various components and/or features. In a number of embodiments, an angle between the charging pad and the top surface when the charging pad is folded up relative to the top surface can be any suitable angle, such as in a range of 85-90 degrees, or 80-90 degrees, etc. The charging pad additionally can include a magnet configured to attract the electronic device to align with the charging pad. In several embodiments, the charging pad can be configured to charge the electronic device via inductive coupling, resonant inductive coupling, or capacitive coupling, etc. In certain embodiments, a central hole of the stand assembly can be concentric with the charging pad and configured to accommodate the charging pad when the charging pad is folded down relative to the top surface. When the charging pad is folded down relative to the top surface of the stand assembly, an upper surface of the charging pad can be substantially flush with the top surface. In some embodiments, the stand assembly further can include a bottom surface coupled to the dial face plate, or the bottom surface can be included in the dial face plate. In certain embodiments, the stand assembly can include the control entirely or partially (e.g., only including the dial face plate).

In many embodiments, the stand assembly further can be coupled to a base for supporting the wireless charging module. The base further can include any suitable components and/or features. In a number of embodiments, the base can include an opening for accommodating the stand assembly and the charging pad. The base also can include an indented upper surface surrounding or located near the top surface of the stand assembly and configured to accommodate a side surface of the electronic device in the upright position. Moreover, the base can include a cable management structure configured to store at least a portion of a power cable for the charging pad. The cable management structure can include any suitable structure for storing the excess power cable. For example, a cable management structure can include a circular space in the base. The circular space can surround the wireless charging module. The circular space further can include an entrance on the interior wall for the power cable coupled to the charging pad to enter the circular space and an circular opening for winding the power cable in the circular space. The circular opening can include a back exit for the connector of the power cable (e.g., a USB connector or a power adapter) to leave the circular space.

In a number embodiments, the base further can be coupled to at least one second charging module for charging at least one second electronic device. The at least one second charging module can be similar to or different from the wireless charging module. For instance, the at least one second charging module can a wired or wireless charger for at least one second electronic device such as a smart phone, a smart watch, and/or a wireless earbuds.

Many embodiments include a method for providing a wireless charging module. The method can include providing a charging pad for the wireless charging module. The method further can include hingedly coupling a stand assembly to the charging pad. In a number of embodiments, the stand assembly can include a top surface. The charging pad can be configured to be folded up or down relative to the top surface to wirelessly charging an electronic device in an upright position or a flat position, respectively, while the electronic device is located over (e.g., lying on or adjacent to) the top surface. The stand assembly also can include an adjustable thickness and can be configured to cause a height of the charging pad to change, relative to a support surface for the wireless charging module.

In some embodiments, the method further can include providing a control for the stand assembly. The control can be configured to allow a user to select one of multiple levels for the adjustable thickness of the stand assembly. There can be a thickness increment between two consecutive levels of the multiple levels for the adjustable thickness, and the thickness increment can be relatively insignificant, such as in a range of 1-2 or 1-3 mm, etc. The thickness increment between the first and the second levels can be similar to or different form the thickness increment between the second and the third level. In several embodiments, providing the control can be part of providing the stand assembly.

In a number of embodiments, the method further can include providing at least one tab and at least one rail corresponding to the at least one tab for the control. The adjustable thickness of the stand assembly can be set at one of the multiple levels for the adjustable thickness when a tip of the at least one tab is received in one of multiple slots of the at least one rail. Each of the multiple slots can correspond to a respective level of the multiple levels. In certain embodiments, the at least one tab can be configured to be moved horizontally (e.g., in a linear, curved, or circular movement) relative to the at least one rail to increase or decrease the adjustable thickness of the stand assembly.

In many embodiments, the method additionally can include providing a dial face plate for the control. The dial face plate can be configured to allow the user to rotatably switch among the multiple levels. The method further can include providing at least one tab and at least one rail corresponding to the at least one tab for the control. The adjustable thickness can be set at one of the multiple levels when a tip of the at least one tab is received in a corresponding slot of multiple slots of the at least one rail. Each of the multiple slots can correspond to a respective level of the multiple levels. In some embodiments, the dial face plate can be configured to be rotated to cause the at least one tab to move horizontally relative to the at least one rail to increase or decrease the adjustable thickness of the stand assembly.

In a number of embodiments, the angle between the charging pad and the top surface of the stand assembly when the charging pad is folded up relative to the top surface can be any suitable angle in a range of 80-90 or 85-90 degrees, etc. The charging pad further can include a magnet configured to attract the electronic device to align with the charging pad. The charging pad can be configured to charge the electronic device via any suitable wireless power transfer methods, such as inductive coupling, resonant inductive coupling, or capacitive coupling. In several embodiments, the stand assembly further can include a central hole which is concentric with the charging pad and configured to accommodate the charging pad when the charging pad is folded down relative to the top surface. When the charging pad is folded down relative to the top surface, an upper surface of the charging pad can be substantially flush with the support surface.

In several embodiments, the method further can include coupling a base to the stand assembly for supporting the wireless charging module. The base can include an opening for accommodating the stand assembly and the charging pad. The base further can include an indented upper surface surrounding or located near the support surface of the stand assembly and configured to accommodate a side surface of the electronic device in the upright position. The base also can include a cable management structure configured to store at least a portion of a power cable for the charging pad. Moreover, the base can be coupled to at least one second charging module (wired or wireless) for charging at least one second electronic device (e.g., a smart phone, a wireless earbuds, a wireless speaker, a computer, etc.).

In many embodiments, a charger for wirelessly charging an electronic device can include a charging module, a base pad, and a control. The charger further can have various modes, such as a flat mode when the electronic device being charged is in a flat position and a night stand mode when the electronic device is charged in an upright position. In some embodiments, the charger can be adjustable to charge electronic devices of different dimensions based on a setting chosen by a user via the control. For example, when the charger is configured to charge Apple Watches® Series 3, 4, 5, 6, 7, and/or SE by Apple Inc. of Cupertino, California, United States of America ("Apple Inc."), the control can be used to choose among settings predetermined based on which series the device is and/or whether a case is used with the Apple Watch® watch face, etc.

In a number of embodiments, the charging module can be configured to charge a device using any suitable techniques. For example, the power can be transferred from the charging module to the device by magnetic fields via inductive coupling or resonant inductive coupling or by electric fields via capacitive coupling. The charging module can be coupled to a power source (e.g., a Universal Serial Bus (USB) port of a computer, or an electrical outlet on the wall, etc.) via a cable (e.g., a USB cable or a power cable) and/or an electric power adapter. The cable can be detachably or fixedly coupled to the charging module.

In some embodiments, the charging module can include a charging pad and a stand. The charging pad can be pivotally coupled to the stand and be folded up or vertically in the nightstand mode to support and charge the device in an upright position. The charging module further can include any suitable components or structures to pivotally couple the charging pad to the stand (e.g., a puck or a pivot spring and a pivot pin). Further, when the control is used to switch or change settings of the charger, the charging module can be raised according to the settings. The charging pad in the nightstand mode can be raised to align with devices of different heights or sizes to charge the devices more efficiently. The control can raise the charging module in any suitable way. For example, the control of the adjustable wireless charger can include one or more tabs that slide along one or more corresponding rails of the stand of the charging module. The one or more rails of the stand can have different heights at different sections so that as the control moves, the one or more tabs move to a higher or lower section of the one or more rails and raise or lower the stand, and the charging pad attached to the stand as well. The one or more rails of the stand also can include one or more locking mechanisms (e.g., one or more slots) configured to receive the one or more tabs to prevent the control and the tabs from accidentally moving.

In several embodiments, the base pad of the wireless charger can be configured to support and/or enclose the charging module and the control. The base pad can include an upper surface configured to accommodate the device being charged. For example, the upper surface of the base pad can be flush with the charging module in the flat mode, and/or be indented around the charging module so that the wristband of an Apple Watch® being charged in the nightstand mode can sit stably on the indented upper surface. In addition, the control of the adjustable wireless charger can be coupled to the base pad in any suitable location. In embodiments where the control contacts the stand of the charging module to raise or lower the stand when the setting changes, the control can be located at the bottom of the charger underneath the charging module.

In a few embodiments, the base pad further can include a cable management structure configured to store excess cable so that the power cable would not tangle. The cable management structure can be hidden at the bottom and/or the side(s) of the base pad to make the charger more aesthetically pleasing. In a number of embodiments, the cable management structure can be a circular recessed groove or a groove that extends along a peripheral of the sides or bottom of the base pad. In some embodiments, the control can be any suitable control mechanisms, such as a switch, a control knob, a slider control, and so forth. Further, the charger can be portable. The charger can include a single charging module or multiple charging modules for similar or different devices, such as cell phones, earbuds, and/or smart watches. Each of the multiple charging modules of a charger can be identical, similar, or different from the charging module described above. For example, when a charger includes more than one charging module, one of the more than one charging module can have a flat mode and a nightstand mode while each of the other charging modules can have one or more of a flat mode, a nightstand mode, and/or any suitable modes for the corresponding devices.

FIGS. 1-8 of this instant application illustrate various views of a portable charger 100 in different configurations for wirelessly charging electronic devices of various dimensions, e.g., Apple Watch® Series 6, 7, 8, or SE. FIGS. 1-4 show a top, front, right side of portable charger 100 in two different configurations, and FIGS. 5-8 show a bottom of portable charger 100. Charger 100 can include a charging module 110, a base or pad stand 120, and a control 130. In some embodiments, charger 100 can have a nightstand mode (see, e.g., FIGS. 1 & 3), when an electronic device (e.g., watch 200) charged by charger 100 is held in an upright position, and a flat mode (see, e.g., FIGS. 2 and 4), when the electronic device (e.g., watch 200) is lying flat on charger 100. Charger 100 can be used to display and charge an Apple Watch®, in either orientation—while lying flat or while upright in the nightstand mode. Charger 100 can include a modern minimalist design that brings a stylish accent to any space. From desktop to hotel nightstand, charger 100 can be compact enough to take anywhere.

In a number of embodiments, charging module 110 can include a charging pad 111 and a stand assembly 112 hingedly coupled to charging pad 111. Charging pad 111 can be folded up or vertically in the nightstand mode (see, e.g., FIGS. 1 and 3) and pushed back down in the flat mode (see, e.g., FIGS. 2-4), relative to the top surface of the stand assembly 112. Further, charging pad 111 can include any suitable charging components and/or be designed to perform specifically for certain devices. For example, charging pad 111 can be a MagSafe charger or a MagSafe-compatible charger, and can be configured to charge Apple Watch® Series 7 or 8 up to 33% faster than other devices (e.g., charging Apple Watch® Series 7 from zero to 80% in 45 minutes).

As shown in FIGS. 1-4, charging pad 111 can be circular, and stand assembly 112 can be a ring with a central hole that is substantially concentric with and configured to accommodate charging pad 111 in the flat mode. Accordingly, charging pad 111 can lay in the central hole of stand assembly 112 in the flat mode, and be substantially flush with stand assembly 112 and/or base 120 (see, e.g., FIGS. 2 and 4) in the flat mode. In similar or different embodiments, charging pad 110 and/or stand 120 can include any suitable shapes, dimensions, and/or configurations. Charger 110 further can be connected to a cable 150 (see, e.g., FIGS. 6-7). Cable 150 can be any suitable cable (e.g., a 1.2 meter (4 feet) USB-C cable) to be coupled to a power source, directly or via a power adapter 500 (e.g., an Apple® 200W USB-C power adapter, Model A2305).

In some embodiments, base 120 can include an indented upper surface 121 circumscribing or otherwise surrounding charging pad 111 and stand assembly 112. Indented upper surface 121 can be configured to allow the electronic device, such as watch 200, to rest stably on indented upper surface 121 when charging pad 111 is charging the device in the nightstand mode (see, e.g., FIG. 1). Base 120 further can include a cable management structure 140 at the bottom surface (see, e.g., FIG. 5). As shown in FIGS. 5-7, cable management structure 140 can include a circular recessed groove surrounding charging module 110 so that cable 150 can wrap under charger 100 using the intuitive and convenient cable management structure 140. In some embodiments, cable 150 can have a length of 1.2 meters and be a USB-C cable. Charger 100 with cable 150 and cable management structure 140 can allow a user to charge a watch while keeping the surface supporting charger 100 and the space surrounding charger 100 clutter-free.

Further, control 130 of charger 100 can be configured to control the height of charging module 110 to enable alignment for a device (e.g., Apple Watch®) with or without a case (around the watch face of the Apple Watch®). Control 130 can include any suitable control mechanisms, such as a selector switch, a rotary knob/plate control, etc. For example, as shown in FIG. 5, control 130 can include a dial located at the bottom of charger 100 and configured to allow a user to rotate a dial face plate 131 of control 130 to switch among multiple options 133 (e.g., Options A, B, and C). In some embodiments, the indications of the options (see, e.g., Options A, B, and C in FIG. 8) can be displayed (e.g., printed, etched, etc.) on a stage 132 of control 130, and an indication of selection (e.g., a triangular symbol in FIGS. 5 and 8) can be displayed on dial face plate 131.

Turning ahead in the drawings, FIG. 8 shows a table of exemplary settings (e.g., Options A, B, and C) for a charger (e.g., charger 100) and the corresponding heights of the devices (e.g., watch 200) and/or the devices with cases (e.g., watch 200 and a case 210). In the first of four rows in FIG. 8, a bottom view of the charger is shown in the left-hand column, and in the next three rows in FIG. 8, a side view of the charger is shown in the left-hand column. In this embodiment, charger 100 can include 3 options, each corresponding to a different setting of charging module 110. For example, to charge a smaller watch 200, such as an Apple Watch® with a height of 38 mm, 40 mm, or 41 mm (e.g., Apple Watch® Series 3 (38 mm) or Series 5 (40 mm)), a user can rotate control 130 to choose Option A (e.g., Level 1). Option A can be a default option where charging module 110 (including charging pad 111 and a top surface of stand assembly 112) is not raised above a top surface of base 120 when charging module 110 is in the nightstand mode. When the user chooses Option B (e.g., Level 2), charging module 110 (including charging pad 111 and the top surface of stand assembly 112) can be raised above the top surface of base 120 when charging module 110 is the nightstand mode, so that charging pad 111 is in an intermediate position and is better aligned with a bigger watch 200, or a smaller watch 200 in case 210, such as Apple Watch® Series 7 (42 mm) or Apple Watch® SE (38 mm) in a case. If the user wants to charge an even bigger watch 200 in case 210 (e.g., Apple Watch® Series 7 (42 mm) in a case), the user can choose Option C (e.g., Level 3) so that charging module 110 (including charging pad 111 and the top surface of stand assembly 112) can be raised further above the top surface of base 120 when charging module 110 is the nightstand mode, so that charging pad 111 is in its highest position and is configured to better align with the bigger watch 200 in case 210. When charging module 110 is in the flat mode and when the setting for stand assembly 112 is in Option B or C, charging module 110 (including a top surface of stand assembly 112) also is raised above the top surface of base 120 compared to when the setting for stand assembly 112 is in Option A.

Figure 9:
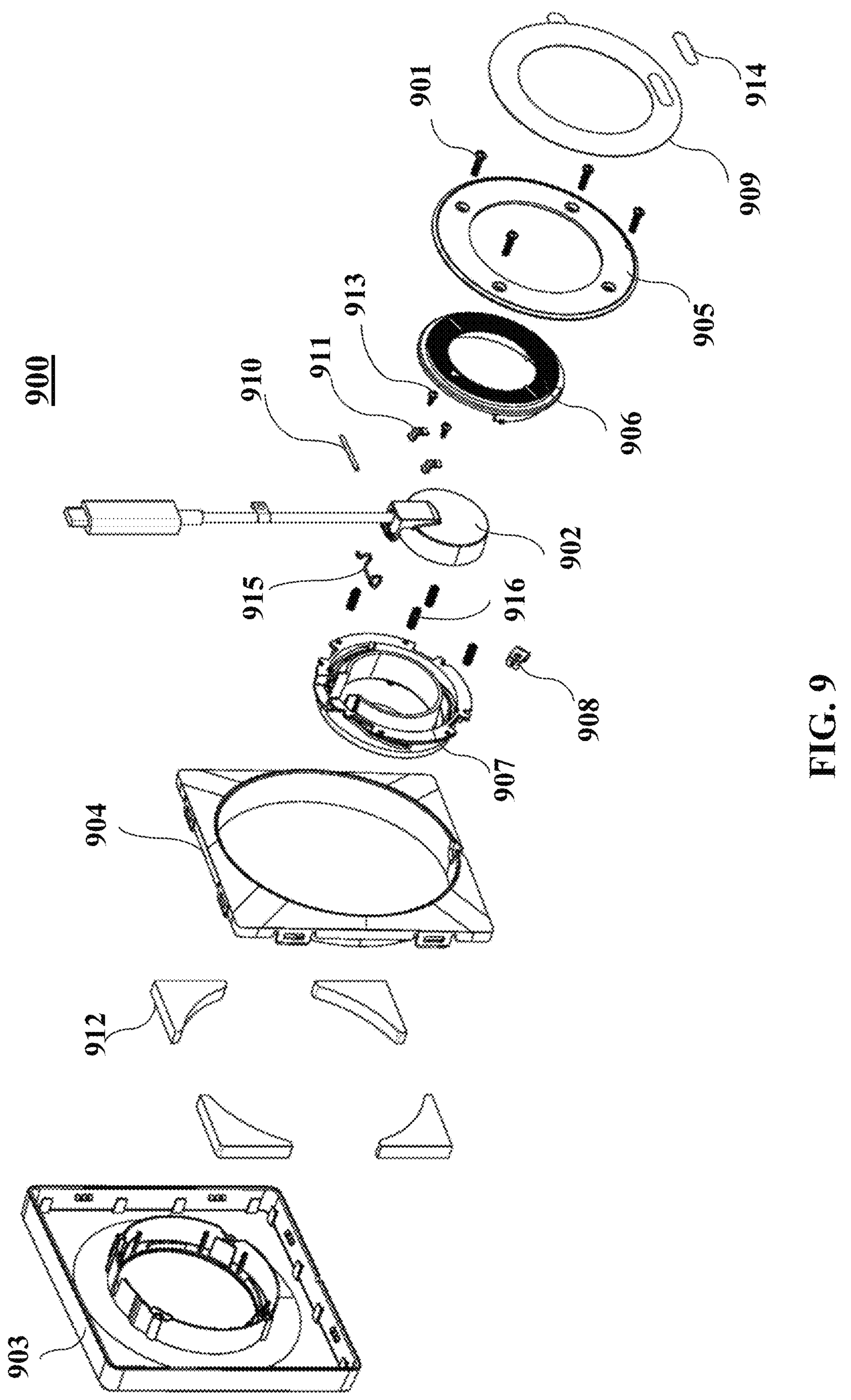
FIG. 9 illustrates an exploded view of a wireless charger, according to an embodiment.

Turning ahead in the drawings, FIG. 9 illustrates an exploded view of a charger 900, according to an embodiment. Charger 900 can be similar or identical to charger 100 in FIGS. 1-8. Some or all of the components of charger 900 can be similar or identical to some or all of the components of charger 100. Charger 900 can include: (a) M2.2×8.5 mm pan head screws 901, (b) a cable assembly 902, (c) a top housing over-mold 903, (d) a bottom housing over-mold 904, (e) a cable cover 905, (f) an adjustment dial 906, (g) an adjustment island (donut) 907, (h) a cable mounting clip 908, (i) an exterior PC label 909, (j) a pivot pin 910, hinge clips 911, (k) assemblies 912 of corner weights and adhesive pads, (l) M1.6×4 mm pan head screws 913, (m) a serial label 914, (n) a pivot spring 915, and/or (o) compression springs 916. In some embodiments, cable assembly 902 of charger 900 can be similar or identical to an assembly of charging pad 111 (FIGS. 1-7) and cable 150 (FIGS. 6-7), and adjustment island 907 can be similar or identical to stand assembly 112 (FIGS. 1-7) or part of stand assembly 112 (FIGS. 1-7). Cable assembly 902 and adjustment island 907 can be pivotally coupled together via pivot spring 915 and pivot pin 910. Adjustment dial 906 can be similar or identical to dial face plate 131 (FIGS. 1-7), and cable cover 905 and exterior PC label 909 can be similar or identical to stage 132 (FIGS. 1-7). In a few embodiments, top housing over-mold 903, bottom housing over-mold 904, and/or assemblies 912 can be similar or identical to base 120 (FIGS. 1-7).

Figures 10, 11, 12:
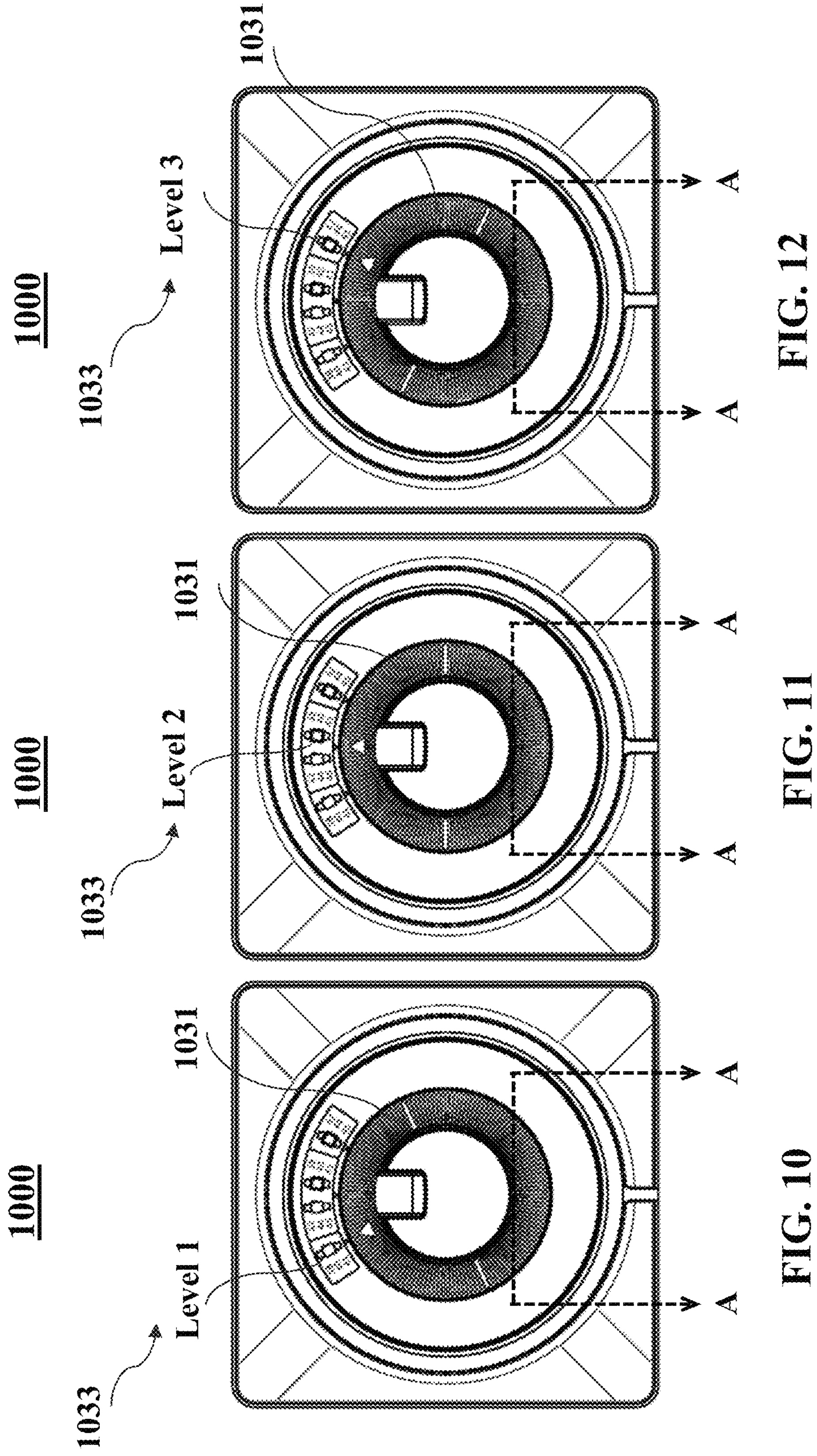
FIGS. 10-12 illustrate bottom plan views of a wireless charger, wherein a level indicator points to a respective selection of level, according to an embodiment.
Figures 13, 14, 15:
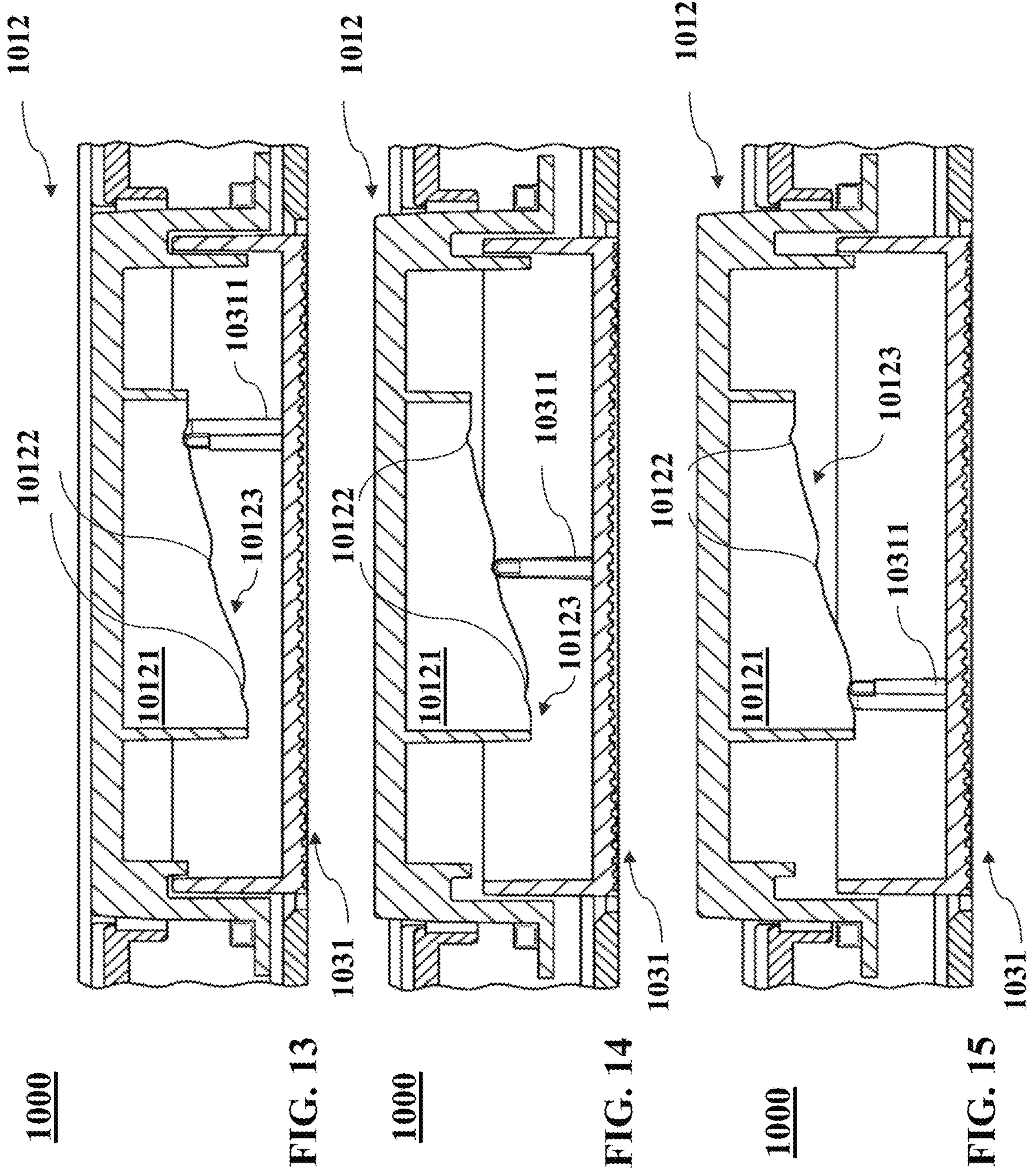
FIGS. 13-15 illustrate partial cross-sectional views of a wireless charger in 3 positions, corresponding to the levels selected, along a respective virtual line A-A in FIGS. 10-12, respectively, according to an embodiment.
Figure 16:
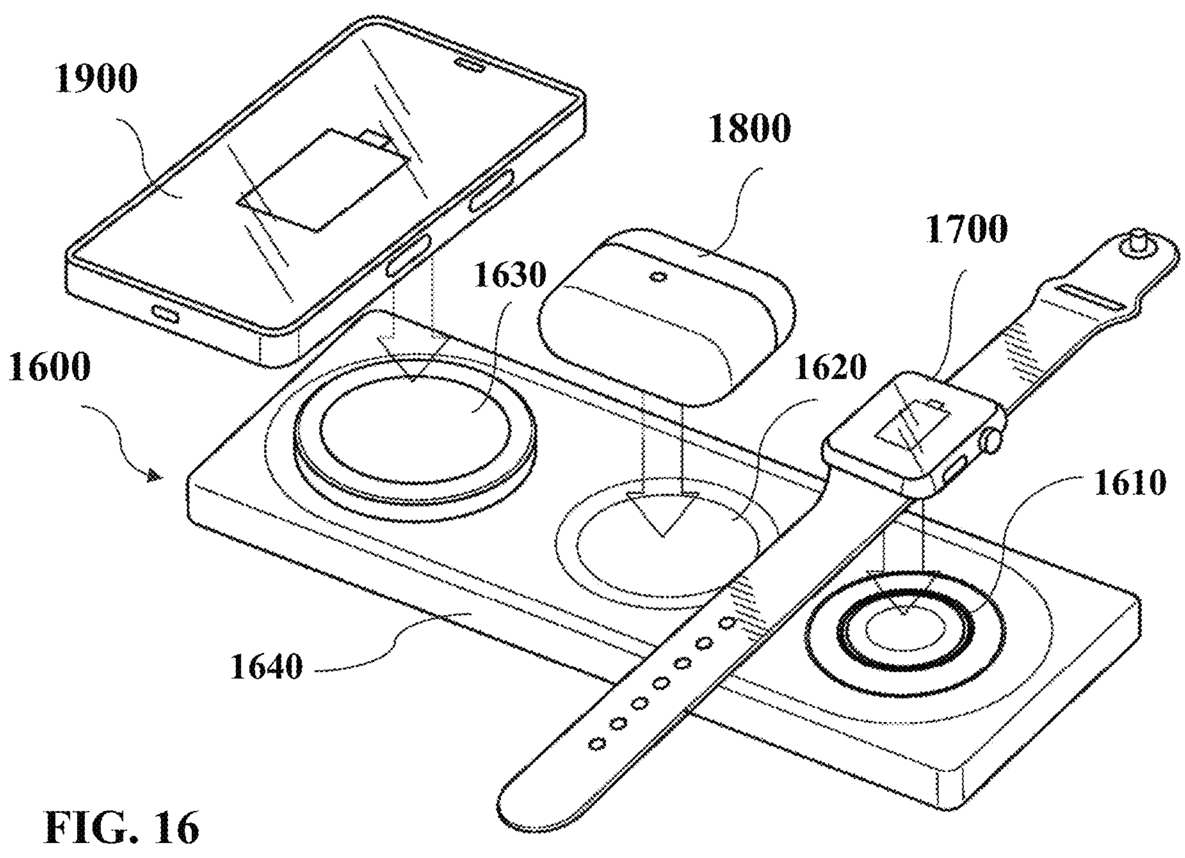
FIG. 16 illustrates a top, front, right side perspective view of a 3-in-1 charger for wirelessly charging different types of electronic devices, according to an embodiment.

Turning ahead in the drawings, FIGS. 10-12 illustrate bottom plan views of a wireless charger 1000 with an adjustment dial 1031 (e.g., dial face plate 131 (FIGS. 5-7)), wherein a level indicator (e.g., a triangular indicator on adjustment dial 1031) on adjustment dial 1031 points to a respective selection of level, according to an embodiment, and FIGS. 13-15 illustrate partial cross-sectional views of charger 1000 in 3 positions, corresponding to the options 1033 selected, along a respective virtual line A-A in FIGS. 10-12. Charger 1000 can be similar or identical to charger 100 (FIGS. 1-8) or charger 900 (FIG. 9). As shown in FIGS. 10 and 13, when Level 1 (see, e.g., Option A (FIG. 5 or 8)) is chosen, the tip of a tab 10311 of adjustment dial 1031 (e.g., dial face plate 131 (FIGS. 5-7) or adjustment dial 906 (FIG. 9)) can be received in one of multiple slots 10122 on a rail 10123 of adjustment island 10121 (e.g., adjustment island 907 (FIG. 9)) of a stand assembly 1012 (e.g., stand assembly 112 (FIGS. 1-4)). The slot corresponding to Level 1 can be close to the shorter end of rail 10123 on the right, and adjustment island 10121 can be in its default, non-raised position. When Level 2 is chosen, as shown in the middle of FIGS. 11 and 14, adjustment dial 1031 can be rotated, moving tab 10311 along rail 10123 toward the taller end until tab 10311 is received in a middle slot of slots 10122 on rail 10123, and adjustment island 10121 can then be raised. When adjustment dial 1031 is rotated to choose Level 3, as shown in FIGS. 12 and 15, tab 10311 can move to a slot further closer to the taller end of rail 10123, and adjustment island 10121 can be raised to even higher.

Figure 17:
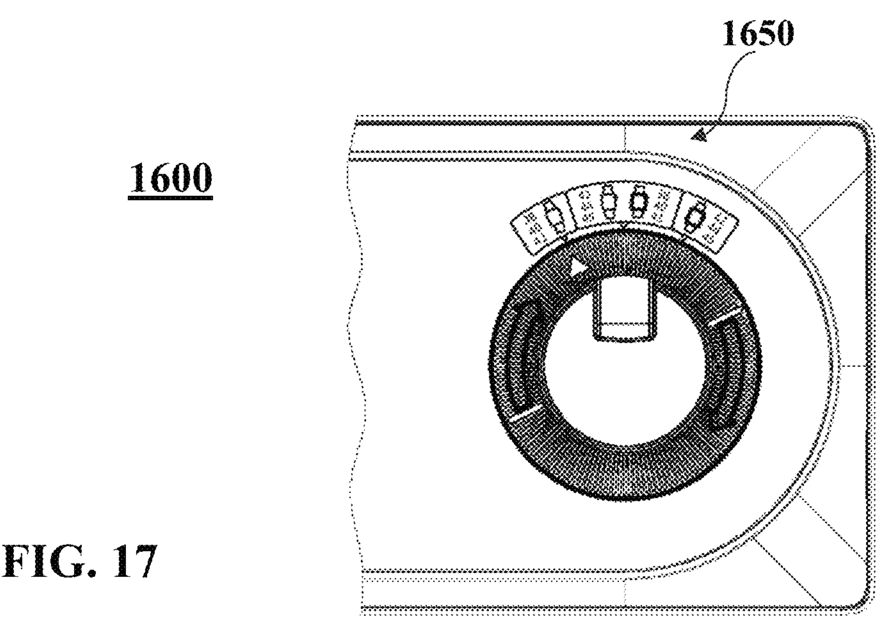
FIG. 17 illustrates a partial bottom plan view of a 3-in-1 charger including a dial face plate for selecting levels, according to an embodiment.
Figures 18, 19, 20, 21:
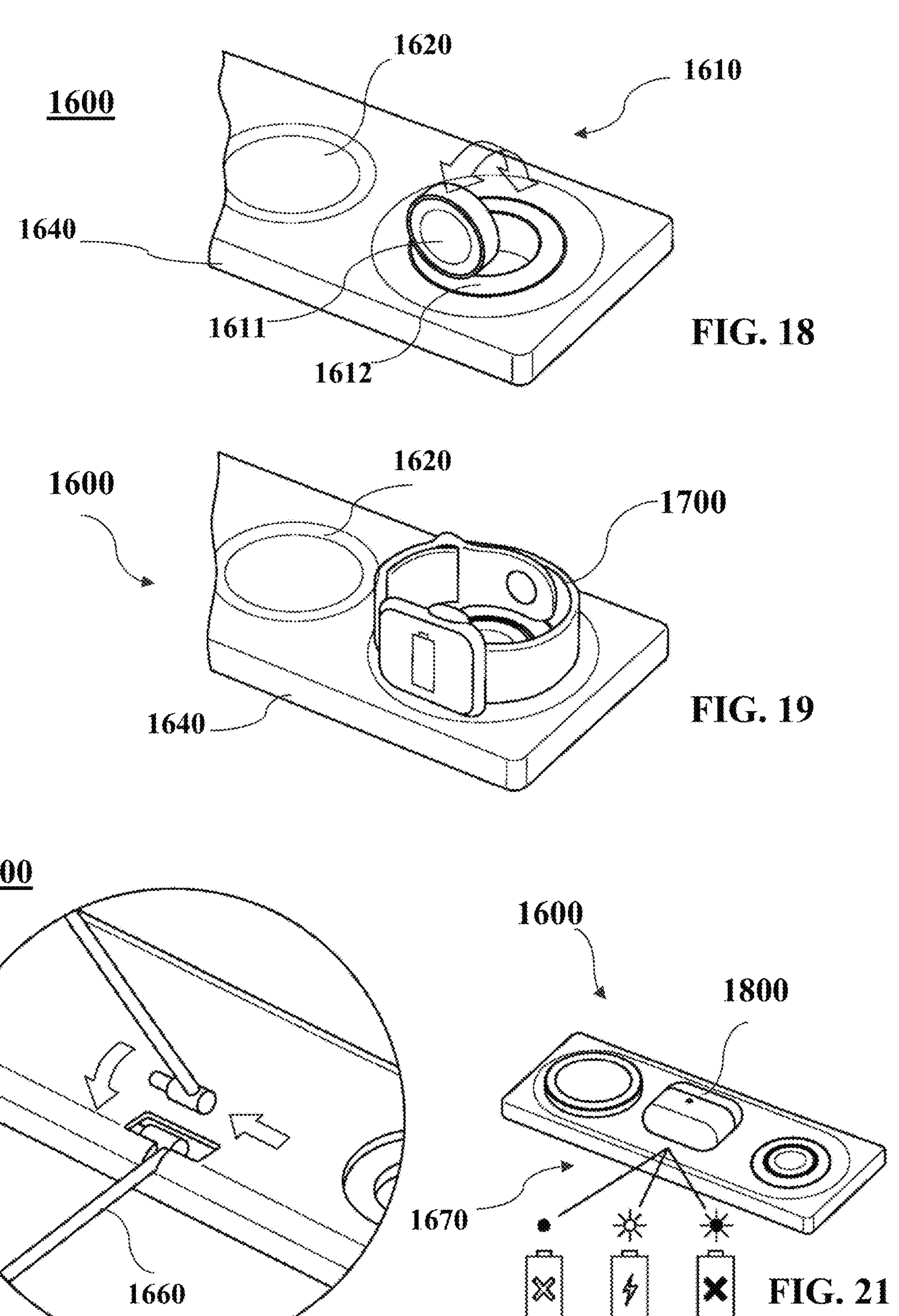
FIGS. 18-19 illustrate partial top, front, right side perspective views of a 3-in-1 charger before and after an electronic device is located over the charger in an upright position, according to an embodiment.
FIG. 20 illustrates a partial bottom rear perspective view of a 3-in-1 charger when a power cord is being coupled to the charger, according to an embodiment.
FIG. 21 illustrates a top, front, right side perspective view of a 3-in-1 charger and 3 charging statuses that an indicator of the charger may show, according to another embodiment.
Figure 22:
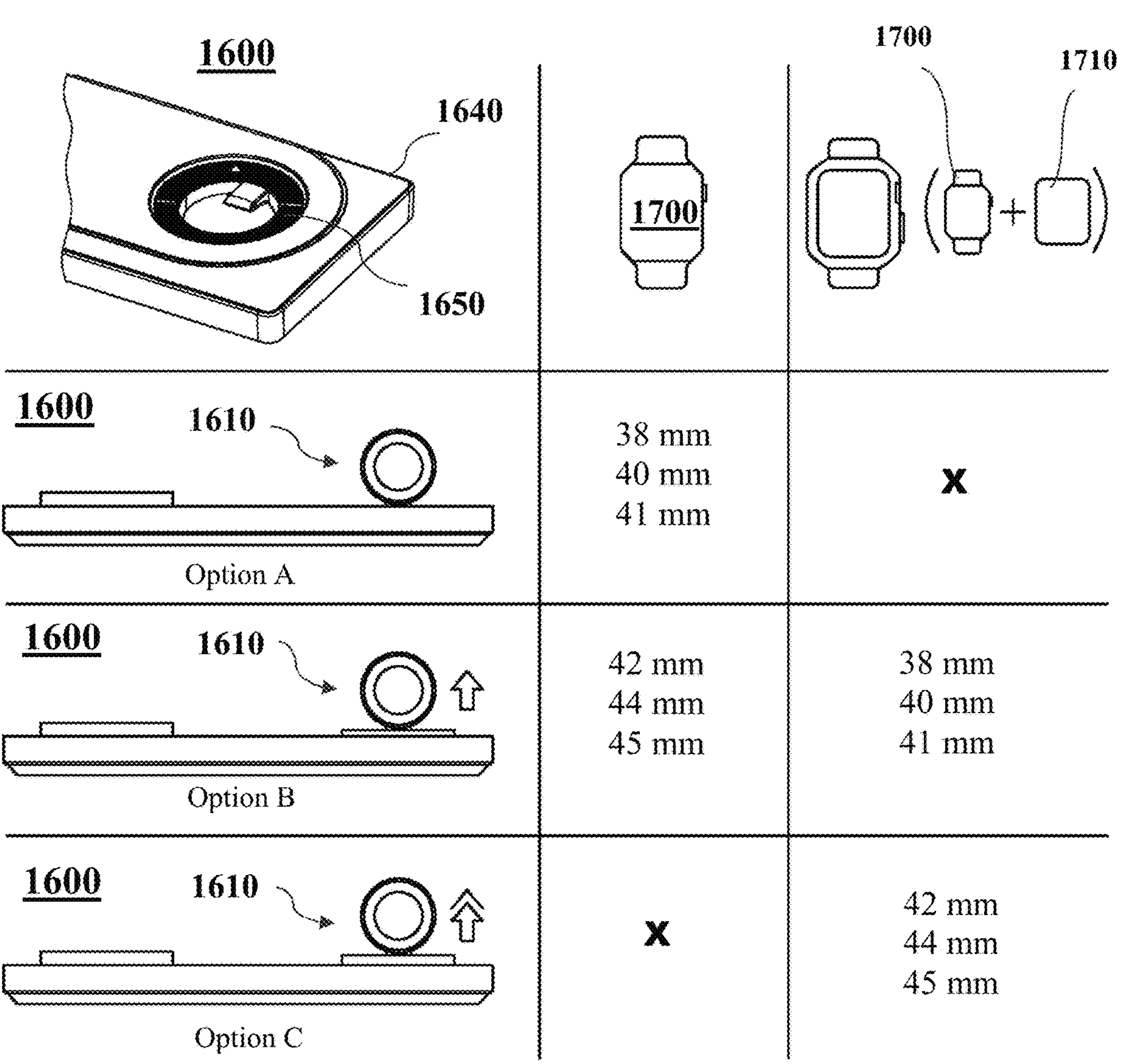
FIG. 22 illustrates a table of exemplary settings for a wireless charging module in a 3-in-1 charger and the corresponding heights of the electronic devices or the electronic devices with cases, according to an embodiment.

Turning ahead in the drawings, FIGS. 16-21 illustrate a 3-in-1 charger 1600 for wirelessly charging different types of electric devices, according to another embodiment. FIGS. 16, 18-19, and 21 show at least a portion of a top surface of 3-in-1 charger 1600, and FIGS. 17 and 20 show portions of a bottom surface of 3-in-1 charger 1600. Charger 1600 can include charging modules 1610, 1620, and 1630, a base or pad stand 1640, and a control 1650. Charger 1600 can charge one or more of: (a) a watch 1700 (e.g., Apple Watch® Series 7 or 8) by charging module 1610, (b) earbuds case 1800 (e.g., Apple® Airpods Pro) by charging module 1620, and/or (c) a smart phone 1900 (e.g., iPhone® 12, 13, or 14) by charging module 1630. In many embodiments, charger 1600 can include charging module 1610 for Apple Watch® Series 7 or 8, charging module 1620 for AirPods® ($2^{nd}$ or $3^{rd}$ generation), and charging module 1630 with MagSafe® technology for iPhone® 12, 13, or 14 to charge Apple® devices by Apple Inc. faster. An exemplary charging module 1610 can provide 33% faster charging for Apple Watch® Series 7 (e.g., charging from 0 to 80% in 45 minutes). Charging module 1610 with official MagSafe® technology can simplify iPhone® 13 and iPhone® 14 model charging experience with seamless alignment and a faster charge up to 15 W. In some embodiments, charger 1600 can be compatible with official MagSafe® cases. For example, charger 1600 can have a dimension of 21 mm (0.835 inch)×86 mm (3.4 inch)×236 mm (9.3 inch).

In many embodiments, charging module 1610 can include a charging pad 1611 and a stand 1612 pivotally coupled to charging pad 1611 (see, e.g., FIG. 18). Charging module 1610 further can include a flat mode and a nightstand mode. Charging pad 1611 can lay flat in the flat mode and charge watch 1700 lying on charging pad 1611 (see, e.g., FIG. 16). Charging pad 1611 also can be folded up or vertically in the nightstand mode and charge watch 1700 in an upright position (see, e.g., FIG. 19). In some embodiments, charging module 1610 can be similar or identical, entirely or partially, to charging module 110 (FIGS. 1-7) or cable assembly 902

(FIG. 9) plus adjustment island 907 (FIG. 9). Charging pad 1611 can be similar or identical to charging pad 111 (FIGS. 1-7) or cable assembly 902 (FIG. 9). Stand assembly 1612 can be similar or identical to stand assembly 112 (FIGS. 1-7) and/or adjustment island 907 (FIG. 9).

In a number of embodiments, control 1650 can be configured to raise charging module 1610 to charge watch 1700 with different heights (e.g., Apple Watch® Series 3 (38 mm), Series 7 (42 mm), etc.) according to the user's choice of options (e.g., 3 options as shown in FIG. 13). Control 1650 further can be located at the bottom of charger 1600, underneath charging module 1610. Control 1650 can control the height of charging module 1610 with any suitable structures, in any suitable way (see, e.g., FIGS. 10-12). Control 1650 can control the height of charging module 1610 by adjusting an adjustable thickness of stand assembly 1612 (e.g., stand assembly 112 (FIGS. 1-7) or 1012 (FIGS. 13-15)). In some embodiments, control 1650 can be similar or identical to control 130 (FIGS. 1-7), adjustment dial 906 (FIG. 9) and adjustment island 907 (FIG. 9), and/or adjustment dial 1031 (FIGS. 10-15).

In several embodiments, charger 1600 further can include a power cable 1660 fixedly or removably coupled to base 1640. As shown in FIG. 20, base 1640 can receive power cable 1660 in a socket at the bottom of base 1640 to prevent power cable 1660 from accidentally falling out. Further, as shown in FIG. 21, charger 1600 further can include an indicator 1670 (e.g., an LED light of various colors, multiple LED lights, or a display for symbols, etc.) configured to indicate the charging status of one or more of watch 1700, earbuds 1800 (e.g., Airpods® PRO), or smart phone 1900 and/or whether such devices are properly placed or aligned over their respective charging locations.

Turning ahead in the drawings, FIG. 21 illustrates another table of exemplary settings (e.g., Options A, B, and C) for a charging module of a charger (e.g., charging module 1610 of charger 1600 (FIGS. 16-21)) and the corresponding heights of the devices (e.g., watch 1700) or the devices with cases (e.g., watch 1700 and case 1710). In the first of four rows in FIG. 21, a bottom view of charger 1600 is shown in the left-hand column, and in the next three rows in FIG. 21, a side view of the charger is shown in the left-hand column. In this embodiment, charging module 1610 can include 3 options, each corresponding to a different setting.

For example, to charge a smaller watch 1700 (e.g., Apple Watch® Series 3 (38 mm), Series 5 (40 mm), Series 7 or 8 (41 mm)), a user can rotate control 1650 (FIGS. 16-20) to choose Option A (e.g., Level 1), which can be a default option where charging module 1610 (including charging pad 1611 (FIGS. 16-20) and a top surface of stand assembly 1612 (FIGS. 16-20)) is not raised above a top surface of base 1640 (FIGS. 16-20) when charging module 1610 is in the nightstand mode. When the user chooses Option B (e.g., Level 2), charging module 1610 (including charging pad 1611 and the top surface of stand assembly 1612) can be raised above a top surface of base 1640 when charging module 1610 is in the nightstand mode, so that charging module 1610 is in an intermediate position and is better aligned with a bigger watch 1700, or a smaller watch 1700 in case 1710, such as an Apple Watch® Series 3 (42 mm) or an Apple Watch® SE 38 mm in a case. If the user wants to charge an even bigger watch 1700 in case 1710 (e.g., Apple Watch® Series 7 (42 mm) in a case), then the user can choose Option C (e.g., Level 3) to raise charging module 1610 (including charging pad 1611 and the top surface of stand assembly 1612) further above a top surface of base 1640 when charging module 1610 is in the nightstand mode, so that charging module 1610 is in its highest position and is better aligned with bigger watch 1700 in case 1710. Further, when charging module 1610 is in the flat mode and when the setting for stand assembly 1612 is in Option B or C, charging module 1610 (including the top surface of stand assembly 1612) also is raised above the top surface of base 1640 compared to when the setting for stand assembly 1612 is in Option A.

Although the charger and/or its components (e.g., the charging module, etc.) have been described with reference to specific embodiments, it will be understood by those skilled in the art that various changes may be made without departing from the spirit or scope of the disclosure. For example, the charger can include one or more charging modules for charging various electric devices. The one or more charging modules can be arranged in any suitable arrangements and be implemented using any suitable charging technologies. Further, in an exemplary embodiment, a charger can include at least one first charging module configured to wirelessly charge electronic devices, and a second charging module to charge electronic devices via a cable, while the first, the second, and/or a third charging modules of the charger can transmit electric power both with wire and wirelessly. Moreover, a charging module can include any suitable charging pad and/or any suitable stand assembly, and a control for controlling the adjustable thickness of the stand assembly can include any suitable components. For example, the charging pad can include various wireless charging technologies and/or be of different dimensions and/or shapes. The control can include a switch, a lever, one or more springs, and/or the stand assembly. Further, the stand assembly can be implemented in any other suitable ways and/or include the entire or part of the control. Accordingly, the disclosure of embodiments is intended to be illustrative of the scope of the disclosure and is not intended to be limiting. It is intended that the scope of the disclosure shall be limited only to the extent required by the appended claims.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A wireless charging module comprising:

a charging pad; and a stand assembly hingedly coupled to the charging pad, wherein:

the stand assembly comprises:

a top surface;

a height that is adjustable relative to a support surface for the wireless charging module; and a control configured to allow a user to adjust the height of the stand assembly while an electronic device is coupled to the charging pad; and the charging pad is configured to be folded up or down relative to the top surface to wirelessly charge the electronic device in an upright position or a flat position, respectively, while the electronic device is coupled to the charging pad.

2. The wireless charging module of claim 1, wherein:

the control is further configured to allow the user to select one of multiple levels for the height of the stand assembly while the user adjusts the height of the stand assembly; and a height increment between two consecutive levels of the multiple levels for the height of the stand assembly is in a range of 1-2 millimeters.

3. The wireless charging module of claim 1, wherein:

the control is further configured to allow the user to select one of multiple levels for the height of the stand assembly while the user adjusts the height of the stand assembly;

the control comprises at least one tab and at least one rail corresponding to the at least one tab;

the height is set at one of the multiple levels for the height of the stand assembly when a tip of the at least one tab is received in one of multiple slots of the at least one rail; and each of the multiple slots corresponds to a respective level of the multiple levels.

4. The wireless charging module of claim 3, wherein:

the at least one tab is configured to be moved horizontally relative to the at least one rail to increase or decrease the height of the stand assembly.

5. The wireless charging module of claim 2, wherein:

the control further comprises a dial face plate for rotatably switching among the multiple levels.

6. The wireless charging module of claim 5, wherein:

the control further comprises at least one tab and at least one rail corresponding to the at least one tab;

the height is set at one of the multiple levels when a tip of the at least one tab is received in a corresponding slot of multiple slots of the at least one rail; and each of the multiple slots corresponds to a respective level of the multiple levels.

7. The wireless charging module of claim 6, wherein:

the dial face plate is configured to be rotated to cause the at least one tab to move horizontally relative to the at least one rail to increase or decrease the height of the stand assembly.

8. The wireless charging module of claim 1, wherein at least one of:

an angle between the charging pad and the top surface when the charging pad is folded up relative to the top surface is in a range of 85-90 degrees;

the charging pad further comprises a magnet configured to attract the electronic device to align with the charging pad;

the charging pad is configured to charge the electronic device via inductive coupling, resonant inductive coupling, or capacitive coupling;

a central hole of the stand assembly is concentric with the charging pad and configured to accommodate the charging pad when the charging pad is folded down relative to the top surface; or when the charging pad is folded down relative to the top surface, an upper surface of the charging pad is substantially flush with the top surface.

9. The wireless charging module of claim 1, wherein:

the stand assembly is further coupled to a base for supporting the wireless charging module; and one or more of:

the base further comprises an opening for accommodating the stand assembly and the charging pad;

the base further comprises an indented upper surface surrounding or located near the top surface of the stand assembly and configured to accommodate a side surface of the electronic device in the upright position; or the base further comprises a cable management structure configured to store at least a portion of a power cable for the charging pad.

10. The wireless charging module of claim 9, wherein the base is further coupled to at least one second charging module for charging at least one second electronic device.

11. A method for providing a wireless charging module, the method comprising:

providing a charging pad for the wireless charging module; and hingedly coupling a stand assembly to the charging pad, wherein:

the stand assembly comprises:

a top surface;

a height that is adjustable relative to a support surface for the wireless charging module; and a control configured to allow a user to adjust the height of the stand assembly while an electronic device is coupled to the charging pad; and the charging pad is configured to be folded up or down relative to the top surface to wirelessly charge the electronic device in an upright position or a flat position, respectively, while the electronic device is coupled to the charging pad.

12. The method of claim 11, wherein:

the control is further configured to allow the user to select one of multiple levels for the height of the stand assembly while the user adjusts the height of the stand assembly; and height increment between two consecutive levels of the multiple levels for the height of the stand assembly is in a range of 1-2 millimeters.

13. The method of claim 11 further comprising:

providing at least one tab and at least one rail corresponding to the at least one tab for the control, wherein:

the control is further configured to allow the user to select one of multiple levels for the height of the stand assembly while the user adjusts the height of the stand assembly;

the height of the stand assembly is set at one of the multiple levels for the height of the stand assembly when a tip of the at least one tab is received in one of multiple slots of the at least one rail; and each of the multiple slots corresponds to a respective level of the multiple levels.

14. The method of claim 13, wherein:

the at least one tab is configured to be moved horizontally relative to the at least one rail to increase or decrease the height of the stand assembly.

15. The method of claim 12 further comprising:

providing a dial face plate for the control, wherein the dial face plate is configured to allow the user to rotatably switch among the multiple levels.

16. The method of claim 15, further comprising:

providing at least one tab and at least one rail corresponding to the at least one tab for the control, wherein:

the height is set at one of the multiple levels when a tip of the at least one tab is received in a corresponding slot of multiple slots of the at least one rail; and each of the multiple slots corresponds to a respective level of the multiple levels.

17. The method of claim 16, wherein:

the dial face plate is configured to be rotated to cause the at least one tab to move horizontally relative to the at least one rail to increase or decrease the height of the stand assembly.

18. The method of claim 11, wherein at least one of:

an angle between the charging pad and the top surface when the charging pad is folded up relative to the top surface is in a range of 85-90 degrees;

the charging pad further comprises a magnet configured to attract the electronic device to align with the charging pad;

the charging pad is configured to charge the electronic device via inductive coupling, resonant inductive coupling, or capacitive coupling;

a central hole of the stand assembly is concentric with the charging pad and configured to accommodate the charging pad when the charging pad is folded down relative to the top surface; or when the charging pad is folded down relative to the top surface, an upper surface of the charging pad is substantially flush with the top surface.

19. The method of claim 11 further comprising:

coupling a base to the stand assembly for supporting the wireless charging module, wherein one or more of:

the base further comprises an opening for accommodating the stand assembly and the charging pad;

the base further comprises an indented upper surface surrounding or located near the top surface of the stand assembly and configured to accommodate a side surface of the electronic device in the upright position; or the base further comprises a cable management structure configured to store at least a portion of a power cable for the charging pad.

20. The method of claim 19, wherein the base is further coupled to at least one second charging module for charging at least one second electronic device.

* * * * *